United States Patent
Danda et al.

(10) Patent No.: US 9,988,314 B2
(45) Date of Patent: Jun. 5, 2018

(54) SINTERED COMPACT AND CUTTING TOOL

(71) Applicants: SUMITOMO ELECTRIC HARDMETAL CORP., Itami-shi (JP); Sumitomo Electric Industries, Ltd., Osaka-shi (JP)

(72) Inventors: Mayu Danda, Itami (JP); Katsumi Okamura, Itami (JP); Satoru Kukino, Itami (JP)

(73) Assignees: SUMITOMO ELECTRIC HARDMETAL CORP., Itami-shi (JP); Sumitomo Electric Industries, Ltd., Osaka-shi (JP)

( * ) Notice: Subject to any disclaimer, the term of this patent is extended or adjusted under 35 U.S.C. 154(b) by 0 days. days.

(21) Appl. No.: 15/327,214

(22) PCT Filed: Feb. 24, 2016

(86) PCT No.: PCT/JP2016/055376
§ 371 (c)(1),
(2) Date: Jan. 18, 2017

(87) PCT Pub. No.: WO2016/194416
PCT Pub. Date: Aug. 12, 2016

(65) Prior Publication Data
US 2017/0197886 A1    Jul. 13, 2017

(30) Foreign Application Priority Data
May 29, 2015   (JP) .................................. 2015-110671

(51) Int. Cl.
*C04B 35/5831*   (2006.01)
*B23B 27/14*     (2006.01)
(Continued)

(52) U.S. Cl.
CPC ........ *C04B 35/5831* (2013.01); *B23B 27/148* (2013.01); *B23C 5/20* (2013.01);
(Continued)

(58) Field of Classification Search
CPC ............ C04B 35/5831; C04B 35/4885; C04B 35/119; B23B 27/148
See application file for complete search history.

(56) References Cited

U.S. PATENT DOCUMENTS 8,814,965 B2    8/2014  Yokoshi
8,962,505 B2 *  2/2015  Okamura .............. C04B 35/117
                                                  407/119
(Continued)

FOREIGN PATENT DOCUMENTS

EP    2520555 A1    11/2012
JP    64-065073 A    3/1989
(Continued)

OTHER PUBLICATIONS

International Search Report in counterpart International Application No. PCT/JP2016/055376, dated Apr. 5, 2016.
(Continued)

*Primary Examiner* — Karl E Group
(74) *Attorney, Agent, or Firm* — Venable LLP; Michael A. Sartori; Miguel A. Lopez

(57) ABSTRACT

A sintered compact has a first material, a second material, and a third material. The first material is cubic boron nitride. The second material is a compound including zirconium. The third material is an aluminum oxide and the aluminum oxide includes a fine-particle aluminum oxide. The sintered compact has a first region in which not less than 5 volume % and not more than 50 volume % of the fine-particle aluminum oxide is dispersed in the second material. On arbitrary straight lines in the first region, an average value of
(Continued)

continuous distances occupied by the fine-particle aluminum oxide is not more than 0.08 μm and a standard deviation of the continuous distances occupied by the fine-particle aluminum oxide is not more than 0.1 μm.

8 Claims, 3 Drawing Sheets

(51) Int. Cl.
*B23C 5/20* (2006.01)
*C04B 35/488* (2006.01)
*C04B 35/63* (2006.01)
*C04B 35/626* (2006.01)
*C04B 35/645* (2006.01)

(52) U.S. Cl.
CPC ...... *C04B 35/4885* (2013.01); *C04B 35/6261* (2013.01); *C04B 35/6264* (2013.01); *C04B 35/6303* (2013.01); *C04B 35/645* (2013.01); *B23B 2224/04* (2013.01); *B23B 2226/125* (2013.01); *B23B 2228/44* (2013.01); *B23C 2224/04* (2013.01); *B23C 2226/125* (2013.01); *B23C 2228/49* (2013.01); *C04B 2235/3217* (2013.01); *C04B 2235/3244* (2013.01); *C04B 2235/386* (2013.01); *C04B 2235/5436* (2013.01); *C04B 2235/656* (2013.01); *C04B 2235/6567* (2013.01)

(56) References Cited

U.S. PATENT DOCUMENTS

| | | | |
|---|---|---|---|
| 8,993,132 B2 * | 3/2015 | Okamura | B23B 27/148 419/13 |
| 9,181,135 B2 * | 11/2015 | Malik | C04B 35/5611 |
| 2010/0313489 A1 | 12/2010 | Teramoto et al. | |
| 2012/0208006 A1 | 8/2012 | Okamura et al. | |
| 2012/0304544 A1 | 12/2012 | Yokoshi | |
| 2012/0329632 A1 | 12/2012 | Malik et al. | |
| 2013/0079215 A1 | 3/2013 | Okamura et al. | |
| 2017/0197885 A1 * | 7/2017 | Okamura | C04B 35/5831 |
| 2017/0197886 A1 | 7/2017 | Danda et al. | |
| 2017/0233295 A1 | 8/2017 | Ishii et al. | |

FOREIGN PATENT DOCUMENTS

| | | |
|---|---|---|
| JP | 2013-039668 | 2/2013 |
| JP | 2014-520063 A | 8/2014 |
| JP | 2014-189474 A | 10/2014 |
| WO | 2008/087940 A1 | 7/2008 |
| WO | 2011/059020 A1 | 5/2011 |
| WO | 2012/029440 A1 | 3/2012 |
| WO | 2012/057183 A1 | 5/2012 |
| WO | 2012/057184 A1 | 5/2012 |
| WO | 2012/153645 A1 | 11/2012 |

OTHER PUBLICATIONS

Yamamoto et al., "Fabrication of High Strength and Toughness Ceramics Using Pulsed Electric-Current Pressure Sintering of $ZrO_2(Y_2O_3)$—$Al_2O_3$ Solid Solution Powders Prepared by the Neutralization Co-precipitation Method," J. Jpn. Soc. Powder Metallurgy, vol. 60, No. 10, 2013, pp. 428-435.

Shibaya et al., "Fabrication of $ZrO_2$Solid Solution Ceramics Containing $Al_2)_3$ Having High Bending Strength ($\sigma$ b ≥1 GPa) and High Fracture Toughness (KIC≥20 MPa·m1/2) Simultaneously by Pulsed Electric-current Pressure Sintering (PECPS),"J. Jpn. Soc. Power Powder Metallurgy, vol. 58, No. 12, 2011, pp. 727-732.

International Search Report in counterpart International Application No. PCT/JP2016/062460, dated May 31, 2016.

Office Action issued in U.S. Appl. No. 15/504,464, dated Oct. 12, 2017.

Notice of Allowance issued in U.S. Appl. No. 15/504,464, dated Feb. 13, 2018.

* cited by examiner (a) Zr

1 μm (b) Al

1 μm (c) O

1 μm

US 9,988,314 B2

SINTERED COMPACT AND CUTTING TOOL

TECHNICAL FIELD

The present invention relates to a sintered compact and a cutting tool including the sintered compact.

BACKGROUND ART

Since cubic boron nitride (hereinafter, also referred to as "cBN") has a high hardness, a sintered compact obtained by sintering cubic boron nitride together with a binding material such as $ZrO_2$ or $Al_2O_3$ has been used for tools such as a cutting tool (WO 2008/087940 (Patent Document 1), WO 2011/059020 (Patent Document 2), WO 2012/029440 (Patent Document 3), and WO 2012/057184 (Patent Document 4)).

CITATION LIST

Patent Document

PTD 1: WO 2008/087940
PTD 2: WO 2011/059020
PTD 3: WO 2012/029440
PTD 4: WO 2012/057184

SUMMARY OF INVENTION

Technical Problem

Meanwhile, a cutting tool or the like employing a sintered compact including cBN and a binding material such as $Al_2O_3$ or $ZrO_2$ may be chipped depending on a condition of use (for example, a cutting condition). Here, it is known that $ZrO_2$ provides a high toughness to a sintered compact. Hence, the toughness of the sintered compact can be excellent by increasing the concentration of $ZrO_2$ in the sintered compact, so that it is considered that chipping resistance of the cutting tool or the like might be improved.

However, it has been reported that when the concentration of $ZrO_2$ in a sintered compact is increased, wear resistance of the sintered compact is decreased (for example, Patent Document 2). In other words, it is considered that increasing the concentration of $ZrO_2$ in the sintered compact to improve the chipping resistance of the cutting tool or the like leads to decreased wear resistance of the sintered compact. Hence, conventionally, it has not been considered realistic to improve the chipping resistance of the cutting tool or the like by providing the sintered compact with not less than a certain concentration of $ZrO_2$. Particularly, when a cutting tool or the like is required to achieve high wear resistance, it has been considered impossible to employ the means for increasing the toughness of the sintered compact by increasing the concentration of $ZrO_2$ in the sintered compact.

The present invention has been made in view of such a circumstance, and has an object to provide a sintered compact having both excellent chipping resistance and excellent wear resistance.

Solution to Problem

A sintered compact according to one embodiment of the present invention includes a first material, a second material, and a third material. The first material is cubic boron nitride. The second material is a compound including zirconium. The third material is an aluminum oxide, and the aluminum oxide includes a fine-particle aluminum oxide. The sintered compact according to one embodiment of the present invention has a first region in which not less than 5 volume % and not more than 50 volume % of the fine-particle aluminum oxide is dispersed in the second material. On arbitrary straight lines in the first region, an average value of continuous distances occupied by the fine-particle aluminum oxide is not more than 0.08 μm and a standard deviation of the continuous distances occupied by the fine-particle aluminum oxide is not more than 0.1 μm.

Advantageous Effects of Invention

According to the configuration described above, there can be provided a sintered compact having both excellent chipping resistance and excellent wear resistance.

DESCRIPTION OF EMBODIMENTS

Figure 1:
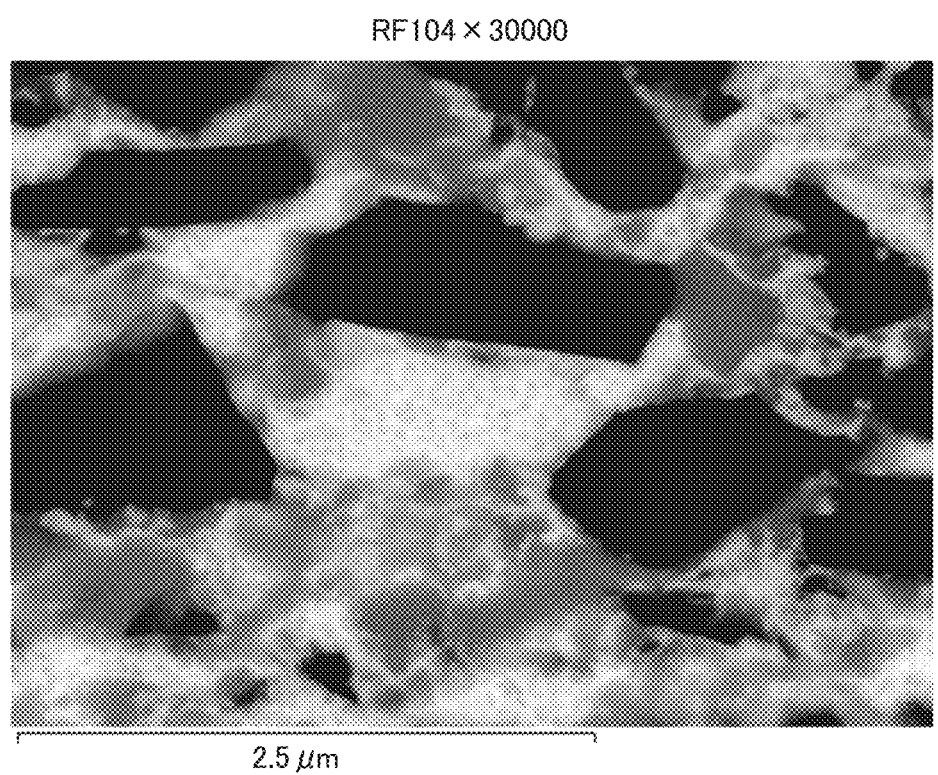
FIG. 1 is an image showing a reflection electron image of an obtained sintered compact in an Example.

[Description of Embodiments of the Present Invention]

First, embodiments of the present invention are listed and described.

[1] A sintered compact according to one embodiment of the present invention includes a first material, a second material, and a third material. The first material is cubic boron nitride. The second material is a compound including zirconium. The third material is an aluminum oxide, and the aluminum oxide includes a fine-particle aluminum oxide. The sintered compact according to one embodiment of the present invention has a first region in which not less than 5 volume % and not more than 50 volume % of the fine-particle aluminum oxide is dispersed in the second material. On arbitrary straight lines in the first region, an average value of continuous distances occupied by the fine-particle aluminum oxide is not more than 0.08 μm and a standard deviation of the continuous distances occupied by the fine-particle aluminum oxide is not more than 0.1 μm. In this sintered compact, both excellent chipping resistance and excellent wear resistance can be achieved.

[2] In the sintered compact according to one embodiment of the present invention, on the arbitrary straight lines in the first region, the average value of continuous distances occupied by the fine-particle aluminum oxide is preferably not less than 0.01 μm and not more than 0.05 μm and the standard deviation of the continuous distances occupied by the fine-particle aluminum oxide is preferably not less than 0.01 μm and not more than 0.05 μm. In this sintered compact, both more excellent chipping resistance and more excellent wear resistance can be achieved.

[3] In the first region, not less than 15 volume % and not more than 40 volume % of the fine-particle aluminum oxide is preferably dispersed in the second material. In this sintered compact, both further excellent chipping resistance and further excellent wear resistance can be achieved.

[4] Not less than 20 volume % and not more than 80 volume % of the first material is preferably included in the sintered compact. In this sintered compact, both more excellent chipping resistance and more excellent wear resistance can be achieved.

[5] Not less than 30 volume % and not more than 60 volume % of the first material is more preferably included in the sintered compact. In this sintered compact, further excellent chipping resistance and further excellent wear resistance can be achieved.

[6] The sintered compact according to one embodiment of the present invention preferably further includes a fourth material. The fourth material is preferably at least one selected from a group consisting of magnesium oxide, cerium oxide, yttrium oxide, and hafnium oxide. In this sintered compact, sinterability is improved to further improve the strength.

[7] The sintered compact according to one embodiment of the present invention preferably further includes a fifth material. The fifth material is preferably at least one compound composed of (i) at least one element selected from a group consisting of a group 4 element, a group 5 element, a group 6 element in a periodic table, Al, and Si, and (ii) at least one element selected from a group consisting of carbon, nitrogen, and boron. Also in this sintered compact, sinterability is improved to further improve the strength.

[8] A cutting tool according to one embodiment of the present invention includes the sintered compact according to one embodiment of the present invention. Accordingly, in the cutting tool according to one embodiment of the present invention, chipping resistance is improved in high-speed long-distance cutting.

[Details of Embodiments of the Present Invention]

The following describes an embodiment (hereinafter, referred to as "the present embodiment") of the present invention more in detail.

As described above, a cutting tool or the like employing a sintered compact including cBN and a binding material such as $Al_2O_3$ or $ZrO_2$ may be chipped depending on a condition of use (for example, a cutting condition). Here, it is known that $ZrO_2$ provides a high toughness to a sintered compact. Hence, the toughness of the sintered compact can be excellent by increasing the concentration of $ZrO_2$ in the sintered compact, so that it is considered that chipping resistance of the cutting tool or the like might be improved.

However, it has been reported that when the concentration of $ZrO_2$ in a sintered compact is increased, wear resistance of the sintered compact is decreased (for example, Patent Document 2). In other words, it is considered that increasing the concentration of $ZrO_2$ in the sintered compact to improve the chipping resistance of the cutting tool or the like leads to decreased wear resistance of the sintered compact. Hence, conventionally, it has not been considered realistic to improve the chipping resistance of the cutting tool or the like by providing the sintered compact with not less than a certain concentration of $ZrO_2$. Particularly, when a cutting tool or the like is required to achieve high wear resistance, it has been considered impossible to employ the means for increasing the toughness of the sintered compact by increasing the concentration of $ZrO_2$ in the sintered compact. It should be noted that conventionally, excellent chipping resistance and excellent wear resistance have been realized in a sintered compact by adding a high-hardness material (for example, TiC or the like) to the sintered compact instead of increasing the concentration of $ZrO_2$ in the sintered compact.

Here, the present inventors diligently reviewed configurations of sintered compacts to satisfy the demand of improving both chipping resistance and wear resistance in a cutting tool or the like. As a result, it has been found that the above demand is satisfied when a fine-particle aluminum oxide is dispersed in a compound including zirconium in at least a portion of the sintered compact. This fact greatly disproves such a common technical knowledge in this technical field that it has not been considered realistic to improve the chipping resistance of the cutting tool or the like by providing the sintered compact with not less than a certain concentration of $ZrO_2$ (a type of compound including zirconium). Particularly, this fact greatly disproves such a common technical knowledge in this technical field that when a cutting tool or the like is required to achieve high wear resistance, it has been considered impossible to employ the means for increasing the toughness of the sintered compact by increasing the concentration of $ZrO_2$ in the sintered compact.

[Configuration of Sintered Compact]

A sintered compact (corresponding to the "sintered compact of the present embodiment") obtained through the diligent review by the present inventors has a first material, a second material, and a third material. The first material is cubic boron nitride. The second material is a compound including zirconium. The third material is an aluminum oxide and the aluminum oxide includes a fine-particle aluminum oxide. The sintered compact of the present embodiment has a first region in which not less than 5 volume % and not more than 50 volume % of the fine-particle aluminum oxide is dispersed in the second material. On arbitrary straight lines in the first region, an average value of continuous distances occupied by the fine-particle aluminum oxide is not more than 0.08 μm, and a standard deviation of the continuous distances occupied by the fine-particle aluminum oxide is not more than 0.1 μm.

The sintered compact of the present embodiment may have only the first material, the second material, and the third material but may have any other component(s) as long as the sintered compact has the first material, the second material, and the third material. Examples of the any other component(s) include a fourth material, a fifth material, and the like as described below; however, the component(s) are not limited to the fourth material and the fifth material. Moreover, the sintered compact of the present embodiment may further have an inevitable impurity as long as a desired effect is exhibited.

<First Material>

The first material included in the sintered compact of the present embodiment is cubic boron nitride. The shapes of particles of the cubic boron nitride of the present embodiment are preferably such that an average particle size thereof is not less than 0.1 μm and not more than 10 μm. If the average particle size of the cBN particles (particles composed of cubic boron nitride) is less than 0.1 μm, the cubic boron nitride is likely to be aggregated during mixing with other powder, with the result that sintering tends to be insufficient. On the other hand, if the average particle size of the cBN particles is more than 10 μm, strength of the sintered compact tends to be decreased. More preferably, the shapes of the particles of the cubic boron nitride of the present embodiment are preferably such that the average particle size thereof is not less than 0.1 μm and not more than 5 μm.

Not less than 20 volume % and not more than 80 volume % of the cubic boron nitride of the present embodiment is preferably included in the sintered compact. If the content volume of the cubic boron nitride in the sintered compact is less than 20 volume %, hardness of the sintered compact is likely to be decreased, with the result that wear resistance of the sintered compact tends to be decreased. On the other hand, if the content volume of the cubic boron nitride in the sintered compact is more than 80 volume %, chipping resistance or wear resistance tends to be decreased in the sintered compact. However, when the content volume of the cubic boron nitride in the sintered compact is not less than 20 volume % and not more than 80 volume %, the wear resistance and chipping resistance can be more improved in the sintered compact. More preferably, the content volume of the cubic boron nitride in the sintered compact is not less than 30 volume % and not more than 60 volume %. Accordingly, in the sintered compact, wear resistance and chipping resistance can be further improved.

It should be noted that each of the components in the composition of the sintered compact of the present embodiment, inclusive of the cubic boron nitride, can be confirmed in the following manner. That is, by performing a CP (Cross Section Polisher) process to the sintered compact using an ion beam, a smooth cross sectional surface (hereinafter, also referred to as "CP processed surface") of the sintered compact is formed. Then, a scanning electron microscope (SEM) is employed to capture a photograph of a structure of the sintered compact at the CP processed surface, and the obtained reflection electron image is observed. In this way, each of the components in the composition of the sintered compact of the present embodiment can be confirmed. Alternatively, each of the components in the composition of the sintered compact of the present embodiment can be also confirmed by employing energy dispersive X-ray spectrometry (EDX) or Auger electron spectroscopy.

Moreover, the average particle size of the cBN particles can be determined as follows. That is, a photograph of the structure of the sintered compact at the CP processed surface is captured using a scanning electron microscope (SEM). The obtained reflection electron image is subjected to a binarization process using image analysis software (trademark: "WinROOF ver.7.4.1" provided by Mitani Corporation, for example) to calculate equivalent circle diameters of the cBN particles. The calculated equivalent circle diameters of the cBN particles are employed for the average particle size of the cBN particles.

Moreover, the content volume of the cubic boron nitride in the sintered compact can be determined as follows. That is, a photograph of the structure of the sintered compact at the CP processed surface is captured using a scanning electron microscope (SEM). In the obtained reflection electron image, the cubic boron nitride is shown as a black region, a compound (described below) including zirconium is shown as a light gray region, and an aluminum oxide (described below) is shown as a dark gray region. This reflection electron image is subjected to a binarization process using image analysis software to determine an occupation area of the cBN particles. The content volume of the cubic boron nitride in the sintered compact can be determined by substituting the determined occupation area of the cBN particles in the following formula: (the content volume of the cubic boron nitride in the sintered compact)= (the occupation area of the cBN particles)/(the area of the captured reflection electron image)×100.

<Second Material>

The second material included in the sintered compact of the present embodiment is a compound including zirconium (hereinafter, also referred to as "Zr compound"). Examples of the Zr compound of the present embodiment include $ZrO_2$, $ZrO$, or $ZrB_2$. The $ZrO_2$ of the present embodiment includes cubic $ZrO_2$ and tetragonal $ZrO_2$, and also includes conventionally known partially stabilized $ZrO_2$. The conventionally known partially stabilized $ZrO_2$ refers to $ZrO_2$ having a crystal structure stabilized by $ZrO_2$ and an oxide other than zirconia forming a solid solution to reduce oxygen vacancy in the crystal structure of zirconia, i.e., refers to $ZrO_2$ having a crystal structure (such as a cubic or tetragonal crystal structure) stable or metastable at room temperature. Examples of the "oxide other than zirconia" include a calcium oxide, a magnesium oxide, and a rare earth oxide such as an yttrium oxide. The conventionally known partially stabilized $ZrO_2$ can include one or two or more of such oxides other than zirconia. It should be noted that the amount of solid solution of the oxide(s) except zirconia is preferably about 1 to 4 mol % relative to $ZrO_2$.

The shapes of the particles of the Zr compound of the present embodiment are preferably such that the average particle size thereof is not less than 1 nm and not more than 500 nm. If the average particle size of the particles of the Zr compound is less than 1 nm, the Zr compound is likely to be aggregated during mixing with other powder, with the result that sintering tends to be insufficient. On the other hand, if the average particle size of the particles of the Zr compound is more than 500 nm, the strength of the sintered compact tends to be decreased.

Moreover, the shapes of the particles of the Zr compound of the present embodiment are preferably such that the average particle size thereof is not more than 100 nm. Accordingly, in the sintered compact of the present embodiment, crack resistance can be more improved, thus more improving chipping resistance. More preferably, the shapes of the particles of the Zr compound of the present embodiment are such that the average particle size thereof is not less than 10 nm and not more than 100 nm.

It should be noted that the average particle size of the particles of the Zr compound can be determined by calculating equivalent circle diameters of the particles of the Zr compound in accordance with the method for determining the average particle size of the cBN particles. Moreover, the content volume of the Zr compound in the sintered compact can be determined in accordance with the method for determining the content volume of the cubic boron nitride in the sintered compact.

<Third Material>

The third material included in the sintered compact of the present embodiment is an aluminum oxide. Examples of the aluminum oxide of the present embodiment include $Al_2O_3$. Examples of $Al_2O_3$ of the present embodiment include $\alpha$-$Al_2O_3$ and $\gamma$-$Al_2O_3$.

The aluminum oxide of the present embodiment includes fine-particle aluminum oxide. The term "fine-particle aluminum oxide" refers to particles of an aluminum oxide (preferably $Al_2O_3$, and more preferably $\alpha$-$Al_2O_3$) having an average particle size of not more than 80 nm, preferably, refers to particles of an aluminum oxide (more preferably $Al_2O_3$, and further preferably $\alpha$-$Al_2O_3$) having an average particle size of not less than 1 nm and not more than 80 nm. The fine-particle aluminum oxide will be further described in the below-described section <First Region>.

In addition to the fine-particle aluminum oxide, the aluminum oxide of the present embodiment may further include particles of an aluminum oxide having an average particle size of not less than 100 nm (hereinafter, also referred to as "large-particle aluminum oxide"). The large-particle aluminum oxide can solely function as a binder phase in the sintered compact. Hence, not less than 5 volume % and not more than 50 volume % of the large-particle aluminum oxide is preferably included in the sintered compact. If the content volume of the large-particle aluminum oxide in the sintered compact is less than 5 volume %, wear resistance tends to be decreased. On the other hand, if the content volume of the large-particle aluminum oxide in the sintered compact is more than 50 volume %, chipping resistance tends to be decreased. More preferably, the content volume of the large-particle aluminum oxide in the sintered compact is not less than 7 volume % and not more than 20 volume %. It should be noted that the content volume of the large-particle aluminum oxide in the sintered compact can be determined in accordance with the method for determining the content volume of the cubic boron nitride in the sintered compact. Moreover, the average particle size of the large-particle aluminum oxide is more preferably not more than 1 µm.

The average particle size of the particles of the aluminum oxide (which include the fine-particle aluminum oxide and the large-particle aluminum oxide) can be determined by calculating equivalent circle diameters of the particles of the aluminum oxide in accordance with the method for determining the average particle size of the cBN particles.

<First Region>

The sintered compact of the present embodiment has the first region (which is considered to function as a binder phase in the sintered compact) in which not less than 5 volume % and not more than 50 volume % of the fine-particle aluminum oxide is dispersed in the second material. On arbitrary straight lines in the first region, the average value of the continuous distances occupied by the fine-particle aluminum oxide is not more than 0.08 µm, and the standard deviation of the continuous distances occupied by the fine-particle aluminum oxide is not more than 0.1 µm. Since the sintered compact of the present embodiment has such a first region, excellent chipping resistance and excellent wear resistance can be achieved in the sintered compact of the present embodiment. Particularly, a very excellent chipping resistance can be achieved. It is considered that this is due to the following reason: toughness and strength of the sintered compact are greatly improved because the fine-particle aluminum provides high toughness and high strength to the structure of the sintered compact.

Preferably, on the arbitrary straight lines in the first region, the average value of the continuous distances occupied by the fine-particle aluminum oxide is not less than 0.01 µm and not more than 0.05 µm, and the standard deviation of the continuous distances occupied by the fine-particle aluminum oxide is not less than 0.01 µm and not more than 0.05 µm. When the sintered compact of the present embodiment has such a first region, more excellent chipping resistance and more excellent wear resistance can be achieved in the sintered compact. It should be noted that in consideration of resolution of a device (for example, a scanning electron microscope (SEM) described below) used for the measurement of the "continuous distances occupied by the fine-particle aluminum oxide on the arbitrary straight lines in the first region", it becomes difficult to measure the distances if the "continuous distances occupied by the fine-particle aluminum oxide on the arbitrary straight lines in the first region" are less than 0.001 µm. Hence, the "average value of the continuous distances occupied by the fine-particle aluminum oxide on the arbitrary straight lines in the first region" is preferably not less than 0.001 µm.

Preferably, not less than 5 volume % and not more than 80 volume % of the first region of the present embodiment is included in the sintered compact. If the content volume of the first region in the sintered compact is less than 5 volume %, toughness tends to be decreased in the sintered compact. On the other hand, if the content volume of the first region in the sintered compact is more than 80 volume %, wear resistance tends to be decreased. More preferably, the content volume of the first region in the sintered compact is not less than 10 volume % and not more than 50 volume %. It should be noted that the content volume of the first region in the sintered compact can be determined in accordance with a method for determining the content volume of the cubic boron nitride in the sintered compact.

The average value of the continuous distances occupied by the fine-particle aluminum oxide on the arbitrary straight lines in the first region and the standard deviation of the continuous distances can be determined as follows. That is, first, the sintered compact is mirror-polished and a scanning electron microscope (SEM) is used to capture a photograph of the structure of the sintered compact at the first region with a magnification of ×80000. In the obtained reflection electron image, contrast of lightness and darkness corresponding to the composition is observed, and a compound is estimated based on an overlapped state of various elements using energy dispersive X-ray spectrometry (EDX) provided in the scanning electron microscope (SEM). In the obtained reflection electron image, the cubic boron nitride is shown as the black region, the Zr compound is shown as the light gray region, and the aluminum oxide is shown as the dark gray region.

Next, ten or more arbitrary straight lines are drawn in the reflection electron image. In doing so, the number of the straight lines is preferably determined such that the total of contact points between the straight lines and the fine-particle aluminum oxide or Zr compound becomes not less than 50. Moreover, the straight lines are preferably drawn such that there are three or more contact points between each of the straight lines and the fine-particle aluminum oxide or Zr compound. Then, continuous distances (lengths) occupied by the fine-particle aluminum oxide in the drawn straight lines are measured, and the average value and standard deviation thereof are determined.

The expression "fine-particle aluminum oxide is dispersed in the second material" means that the fine-particle aluminum oxide is dispersed in a crystal grain boundary or crystal grain of the Zr compound (for example, the above-described partially stabilized $ZrO_2$ or the like). The location of the fine-particle aluminum oxide can be confirmed as follows. That is, first, an ion beam is employed to perform a CP process to the sintered compact, thereby forming a CP processed surface. Next, a scanning electron microscope (SEM) is used to observe the CP processed surface. In this way, the location of the fine-particle aluminum oxide can be confirmed.

When the average particle size of the fine-particle aluminum oxide is smaller, the strength of the sintered compact can be increased. For example, the average particle size of the fine-particle aluminum oxide is preferably not more than 50 nm, and is more preferably not more than 30 nm. It should be noted that when the average particle size of the fine-particle aluminum oxide becomes too small, toughness of the aluminum oxide is likely to be decreased. Accordingly, the average particle size of the fine-particle aluminum oxide is preferably not less than 5 nm.

The content volume of the fine-particle aluminum oxide in the first region is not less than 5 volume % and not more than 50 volume %. If the content volume of the fine-particle aluminum oxide in the first region is less than 5 volume %, it becomes difficult to achieve both excellent chipping resistance and excellent wear resistance in the sintered compact. On the other hand, if the content volume of the fine-particle aluminum oxide in the first region is more than 50 volume %, toughness of the sintered compact is significantly decreased, with the result that chipping resistance of the sintered compact is decreased significantly. Preferably, the content volume of the fine-particle aluminum oxide in the first region is not less than 15 volume % and not more than 40 volume %. It should be noted that the content volume of the fine-particle aluminum oxide in the first region can be determined in accordance with the method for determining the content volume of the cubic boron nitride in the sintered compact.

<Fourth Material>

The sintered compact of the present embodiment can further have the fourth material in addition to the above-described first to third materials. The fourth material is preferably at least one selected from a group consisting of magnesium oxide, cerium oxide, yttrium oxide, and hafnium oxide. When such a fourth material is included in the sintered compact, sinterability is improved, thereby further improving strength of the sintered compact.

The shapes of the particles of the fourth material are preferably such that the average particle size thereof is not less than 0.05 µm and not more than 5 µm. If the average particle size of the particles of the fourth material is less than 0.05 µm, the fourth material is likely to be aggregated during mixing with other powder, with the result that sintering tends to be insufficient. On the other hand, if the average particle size of the particles of the fourth material is more than 5 µm, the strength of the sintered compact tends to be decreased.

Not less than 5 volume % and not more than 50 volume % of the fourth material of the present embodiment is preferably included in the sintered compact. If the content volume of the fourth material in the sintered compact is less than 5 volume %, the strength of the sintered compact tends to be insufficiently improved. On the other hand, if the content volume of the fourth material in the sintered compact is more than 50 volume %, it becomes difficult to secure the content volume of the cubic boron nitride in the sintered compact, with the result that the hardness of the sintered compact tends to be decreased. More preferably, not less than 10 volume % and not more than 30 volume % of the fourth material of the present embodiment is included in the sintered compact.

It should be noted that the average particle size of the particles of the fourth material can be determined by calculating equivalent circle diameters of the particles of the fourth material in accordance with the method for determining the average particle size of the cBN particles. Moreover, the content volume of the fourth material in the sintered compact can be determined in accordance with the method for determining the content volume of the cubic boron nitride in the sintered compact.

<Fifth Material>

The sintered compact of the present embodiment can further have the fifth material in addition to the above-described first to third materials. The fifth material may be included in the sintered compact of the present embodiment together with the fourth material.

The fifth material of the present embodiment is preferably at least one compound composed of (i) at least one element selected from a group consisting of a group 4 element, a group 5 element, a group 6 element in a periodic table, Al, and Si, and (ii) at least one element selected from a group consisting of carbon, nitrogen, and boron. When such a fifth material is included in the sintered compact, sinterability is improved, thereby further improving strength of the sintered compact.

Specific examples of the compound includes TiC, TiN, $TiB_2$, TiCrN, ZrC, ZrN, $ZrB_2$, AlCrN, AlN, $AlB_2$, SiC, $Si_3N_4$, HfC, HfN, VC, VN, NbC, TaC, CrC, CrN, $Cr_2N$, MoC, WC, or the like. One of these compounds may be included in the sintered compact of the present embodiment, or a combination of two or more of these compounds may be included in the sintered compact of the present embodiment.

The shapes of the particles of the fifth material are preferably such that the average particle size thereof is not less than 0.05 µm and not more than 5 µm. If the average particle size of the particles of the fifth material is less than 0.05 µm, the fifth material is likely to be aggregated during mixing with other powder, with the result that sintering tends to be insufficient. On the other hand, if the average particle size of the particles of the fifth material is more than 5 µm, the strength of the sintered compact tends to be decreased.

Not less than 5 volume % and not more than 50 volume % of the fifth material of the present embodiment is preferably included in the sintered compact. If the content volume of the fifth material in the sintered compact is less than 5 volume %, the strength of the sintered compact tends to be insufficiently improved. On the other hand, when the content volume of the fifth material in the sintered compact is more than 50 volume %, it becomes difficult to secure the content volume of the cubic boron nitride in the sintered compact, with the result that the hardness of the sintered compact tends to be decreased. More preferably, not less than 10 volume % and not more than 30 volume % of the fifth material of the present embodiment is included in the sintered compact.

It should be noted that the average particle size of the particles of the fifth material can be determined by calculating equivalent circle diameters of the particles of the fifth material in accordance with the method for determining the average particle size of the cBN particles. Moreover, the content volume of the fifth material in the sintered compact can be determined in accordance with the method for determining the content volume of the cubic boron nitride in the sintered compact.

[Production of Sintered Compact]

The sintered compact of the present embodiment can be produced as follows. That is, raw materials of the sintered compact are prepared first. Next, the prepared raw materials of the sintered compact are mixed and are then sintered. In this way, the sintered compact of the present embodiment can be produced. Hereinafter, each step will be described.

<Preparation of Raw Materials of Sintered Compact>

As the raw materials of the sintered compact, a material (hereinafter, referred to as "first region material") to form the first region and cubic boron nitride are prepared. Preferably, the first region material is produced in accordance with a method described below. Moreover, as a raw material of the sintered compact, a material different from the first region material and the cubic boron nitride (for example, the large-particle aluminum oxide, the fourth material, the fifth material, or the like) may be further prepared.

<Production of First Region Material>

For example, the first region material can be obtained using a below-described neutralization co-precipitation method or sol-gel method.

(Neutralization Co-Precipitation Method)

The neutralization co-precipitation method is a method including the following steps A and B. Such a method is described in a paper (J. Jpn. Soc. Powder Power Metallurgy, Vol. 60, No. 10, P428-435) published in 2013, for example.

In step A, a mixed solution is prepared using zirconium salt (salt to serve as the second material), yttrium salt (salt to serve as a material that may be included in the second material), aluminum salt (salt to serve as the third material), and a predetermined solvent. In doing so, in the mixed solution, the three metal salts are preferably mixed such that: a molar ratio of zirconia ($ZrO_2$) to yttria ($Y_2O_3$) satisfies "$ZrO_2:Y_2O_3$=98.2:1.8 to 98.8:1.2"; and a molar ratio of $ZrO_2$ having yttria added therein to alumina ($Al_2O_3$) satisfies "($ZrO_2$ having $Y_2O_3$ added therein):$Al_2O_3$=50:50 to 90:10". It should be noted that the oxide mixed in $ZrO_2$ in the solid state should not be limited to $Y_2O_3$, and may be calcium oxide, magnesium oxide, or a rare earth oxide other than $Y_2O_3$.

In step B, the mixed solution obtained in step A is neutralized by adding alkali thereto, thereby co-precipitating zirconium, yttrium, and aluminum. The obtained precipitate is dried, is then heated at 650° C. to 750° C. for 7 to 12 hours, and is then calcinated at 850° C. to 950° C. for 0.5 to 3 hours. In this way, $Y_2O_3$-stabilized $ZrO_2$—$Al_2O_3$ solid solution powder (the first region material) is obtained.

Here, examples of the zirconium salt in step A include: zirconium oxychloride ($ZrOCl_2$), zirconium oxynitrate ($ZrO(NO_3)_2$), and the like. Examples of the yttrium salt include yttrium chloride ($YCl_3$), yttrium nitrate ($Y(NO_3)_3$), and the like. Examples of the aluminum salt include aluminum chloride ($AlCl_3$) and the like. Moreover, examples of the predetermined solvent for the mixed solution include water, nitric acid, hydrochloric acid, and the like.

(Sol-Gel Method)

The sol-gel method is a method including the following step X. Such a method is, for example, described in a paper (J. Jpn. Soc. Powder Power Metallurgy, Vol. 58, No. 12, P727-732) published in 2011.

In step X, the sol-gel method is used to prepare amorphous solid solution powder of $ZrO_2$ (99.7 to 98.3 mol % of $ZrO_2$-0.3 to 1.7 mol % of $Y_2O_3$)-10 to 50 mol % of $Al_2O_3$) (the third material)) obtained by adding 0.3 to 1.7 mol % of $Y_2O_3$ (oxide that may be included in the second material) to $ZrO_2$ (the second material). The obtained powder is calcinated at a crystallization temperature or higher. In this way, crystalline $ZrO_2$ solid solution powder (the first region material) is obtained.

(Other Method)

The first region material of the present embodiment can be obtained also by a method described hereinafter. That is, a grinder such as a bead mill or a ball mill is used to mix partially stabilized $ZrO_2$ with $Al_2O_3$ in a solvent such as ethanol, thereby obtaining a slurry. Next, granulation is performed using this slurry. In this way, the first region material can be obtained. Granulation means is not particularly limited, and preferable examples thereof include melt granulation, spray granulation, or the like.

It should be noted that the strength of the first region material obtained by the above method can be improved by the following process (1) or (2):

(1) sintering the first region material in a heat treatment furnace (for example, at 1000° C. in vacuum for 3 hours); or (2) adding 10 mass % of a binder (a general binder such as PVB (poly(vinyl butyral)) to the slurry, which is a precursor of the granulated material.

<Sintering>

The bead mill or the ball mill is used to mix the obtained first region material, cubic boron nitride, and, as required, another material (such as the large-particle aluminum oxide, the fourth material, or the fifth material). Then, the obtained mixture is sintered. For example, sintering is preferably performed at a temperature of not less than 1300° C. and not more than 1700° C. under a pressure of not less than 10 MPa and not more than 7 GPa for not less than 10 minutes and not more than 60 minutes. More preferably, sintering is performed at a pressure of not less than 4 GPa and not more than 7 GPa. Although the sintering method is not particularly limited, spark plasma sintering (SPS), hot press, ultra-high pressure press or the like can be used.

It should be noted that the particles of the aluminum oxide in the first region material have such characteristics that their particle sizes are changed depending on sintering conditions. Moreover, even under the same sintering condition, the particle sizes of the particles (particles of the aluminum oxide in the first region material) differ between (i) a case where only the first region material is sintered and (ii) a case where the first region material and the cubic boron nitride are mixed and sintered. Specifically, in comparison between (i) the particle sizes of the particles in the case where only the first region material is sintered and (ii) the particle sizes of the particles in the case where the first region material and the cubic boron nitride are mixed and sintered, the latter (i.e., the particle sizes of the particles in the sintered compact including the cubic boron nitride) are finer particle sizes (crystal grain sizes), which are about ⅒ of the particle sizes of the former (i.e., the particle sizes of the particles including only the first region material) even though the same sintering condition (temperature, pressure, and the like) is employed.

Hence, it is a specific phenomenon that the particle sizes (crystal grain sizes) of the particles (particles of the aluminum oxide in the first region material) become not more than 0.1 μm when the first region material and the cubic boron nitride are mixed and sintered. In other words, by mixing the first region material with the cubic boron nitride and sintering them, the fine-particle aluminum oxide is obtained, thereby obtaining the sintered compact having the first region.

Moreover, the present inventors confirmed the following matters: (i) the particle sizes of the particles of the aluminum oxide in the first region material become smaller when the first region material and the cubic boron nitride are mixed and are sintered at a low temperature under a high pressure; and (ii) the particle sizes of the particles of the aluminum oxide in the first region material becomes relatively large when the first region material and the cubic boron nitride are mixed and are sintered at a high temperature under a low pressure (see Examples described below). It is preferable to set the sintering condition in consideration of these.

Moreover, based on an X-ray diffraction spectrum of the obtained sintered compact, the present inventors confirmed that as the Zr compound, the obtained sintered compact includes not only cubic $ZrO_2$ or tetragonal $ZrO_2$ but also $ZrO$, $ZrB_2$, or $ZrO$, and $ZrB_2$. The present inventors considered that a certain chemical reaction occurs by mixing and sintering the first region material and the cubic boron nitride to generate $ZrO$ and $ZrB_2$.

[Cutting Tool]

As described above, the sintered compact of the present embodiment exhibits excellent chipping resistance and excellent wear resistance. Accordingly, it is suitable to use the sintered compact of the present embodiment for a cutting tool or the like. That is, a cutting tool of the present embodiment includes the sintered compact of the present embodiment.

Examples of the cutting tool of the present embodiment include a drill, an end mill, an indexable cutting insert for drill, an indexable cutting insert for end mill, an indexable cutting insert for milling, an indexable cutting insert for turning, a metal saw, a gear cutting tool, a reamer, a tap, a cutting bite, and the like.

It should be noted that the cutting tool of the present embodiment may be entirely constituted of the sintered compact of the present embodiment, or may be partially (for example, edge portion) constituted of the sintered compact of the present embodiment. Moreover, a coating film may be formed on a surface of the cutting tool of the present embodiment.

Moreover, the sintered compact of the present embodiment is not used only for the cutting tool, and may be used for a friction stir tool or the like, for example.

EXAMPLES

While the present invention will be described in more detail hereinafter with reference to Examples, the present invention is not limited thereto.

[Sintered Compact No. 1]
[Production of Sintered Compact]

A sintered compact No. 1 was produced as follows.
<Preparation of Raw Materials>

As raw materials of sintered compact No. 1, the following materials were prepared: 55 volume % of the first material (cBN particles having an average particle size of 2 μm); 25 volume % of the first region material (particles having an average particle size of 0.1 μm); 15 volume % of the third material (particles of α-$Al_2O_3$ having an average particle size of 0.5 μm); and 5 volume % of metallic Al (particles having an average particle size of 2.0 μm) serving as a sintering auxiliary agent. It should be noted that the first region material was produced as described below.

<Production of First Region Material>

The neutralization co-precipitation method is described in a paper (J. Jpn. Soc. Powder Power Metallurgy, Vol. 60, No. 10, P428-435) published in 2013.

First, zirconium oxychloride ($ZrOCl_2.8H_2O$), aluminum chloride ($AlCl_3$), and yttrium chloride ($YCl_3$) are added to water to prepare a mixed solution (mixed aqueous solution in the present example). In doing so, the above-described three metal salts are mixed such that: a molar ratio of $ZrO_2$ to $Y_2O_3$ satisfies "$ZrO_2:Y_2O_3=98.5:1.5$"; and a molar ratio of $ZrO_2$ having $Y_2O_3$ added therein to $Al_2O_3$ satisfies "($ZrO_2$ having $Y_2O_3$ added therein):$Al_2O_3=75:25$".

Next, an aqueous ammonia solution is added to the obtained mixed aqueous solution to simultaneously neutralize and co-precipitate Zr, and Y and Al. The obtained precipitate is filtered, is washed with water, and is dried. Accordingly, amorphous hydrated zirconia (75 mol % (98.5 mol % of $ZrO_2$-1.5 mol % of $Y_2O_3$)-25 mol % of $Al_2O_3$) solid solution powder is obtained.

Next, the obtained amorphous hydrated zirconia solid solution powder is calcinated (heated) for 9 hours in air at 700° C., and is calcinated at 900° C. for 1 hour to obtain crystalline $ZrO_2$ (in which $Al_2O_3$ and $Y_2O_3$ are mixed in the solid state) powder (the first region material).

<Sintering>

The prepared raw materials of sintered compact No. 1 were mixed using a ball mill. The obtained mixture was filled in a capsule made of Nb and the capsule was set in a container of an ultra-high pressure generator. Sintering was performed under a sintering pressure of 7 GPa at a sintering temperature of 1450° C. for 15 minutes. In this way, sintered compact No. 1 was obtained.

[Evaluation of Structure of Sintered Compact]

The obtained sintered compact No. 1 was subjected to a CP process using an ion beam. Accordingly, a CP processed surface was formed in sintered compact No. 1. Then, a scanning electron microscope (SEM) was employed to capture a photograph of the structure of the sintered compact of the CP processed surface. In doing so, an acceleration voltage was set at 10 kV and a photograph of a field of view with a magnification of ×30000 was captured. The obtained photograph (reflection electron image) is shown in FIG. 1.

Figure 2:
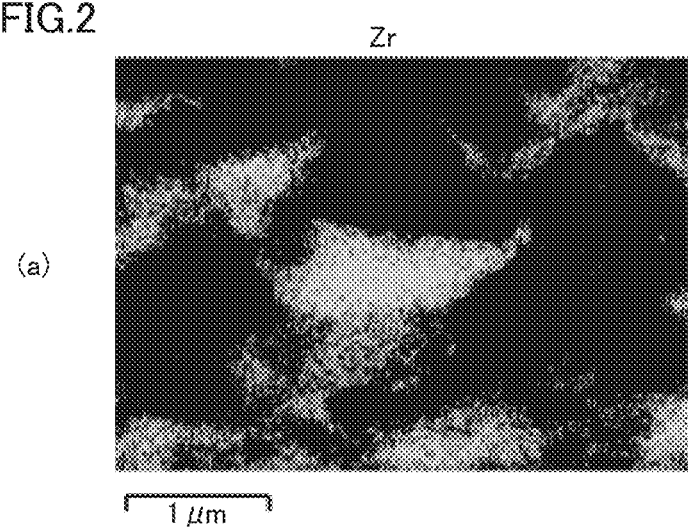
FIG. 2 is an image showing a result of identifying elements in the reflection electron image of the obtained sintered compact in the Example.
Figure 2:
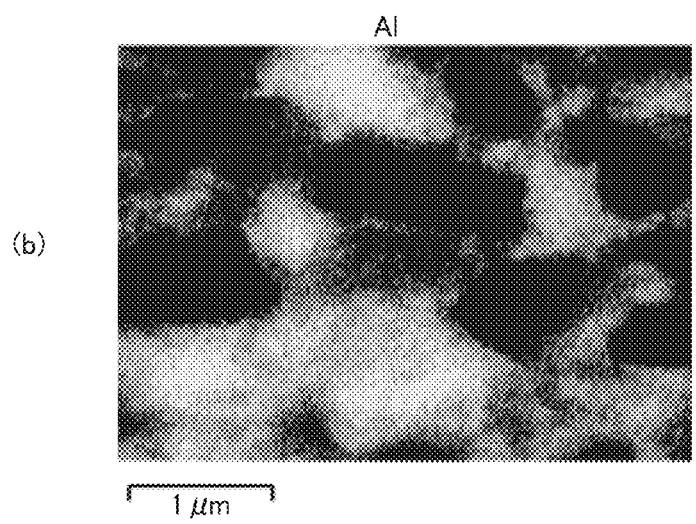
Figure 2:
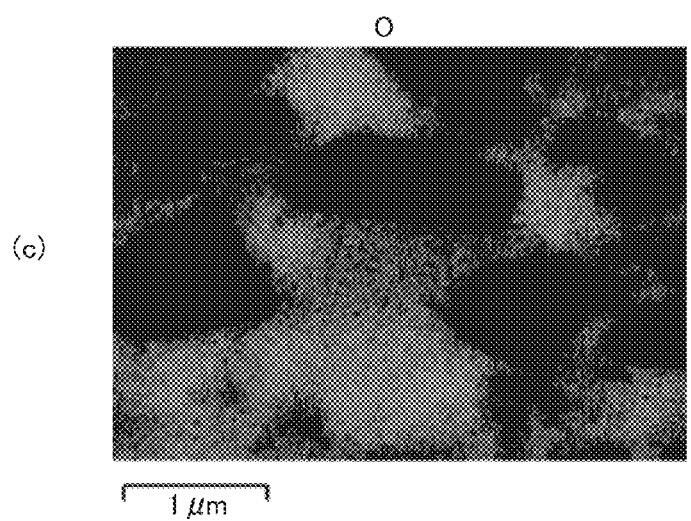

Moreover, energy dispersive X-ray spectrometry (EDX) provided in the scanning electron microscope (SEM) was employed to identify elements in the obtained reflection electron image, thereby specifying regions in which zirconium, aluminum, and oxygen were detected (FIG. 2(a) to FIG. 2(c)). In the reflection electron image, the Zr compound is shown as a light gray region, and the aluminum oxide is shown as a dark gray region. Therefore, it was found that: zirconium exists uniformly in the region surrounded by the black region (specified as the cubic boron nitride) (image shown in FIG. 2(a)); aluminum is interspersed in the region surrounded by the black region (image shown in FIG. 2(b)); and oxygen exists uniformly in the region surrounded by the black region (image shown in FIG. 2(c)).

Figure 3:
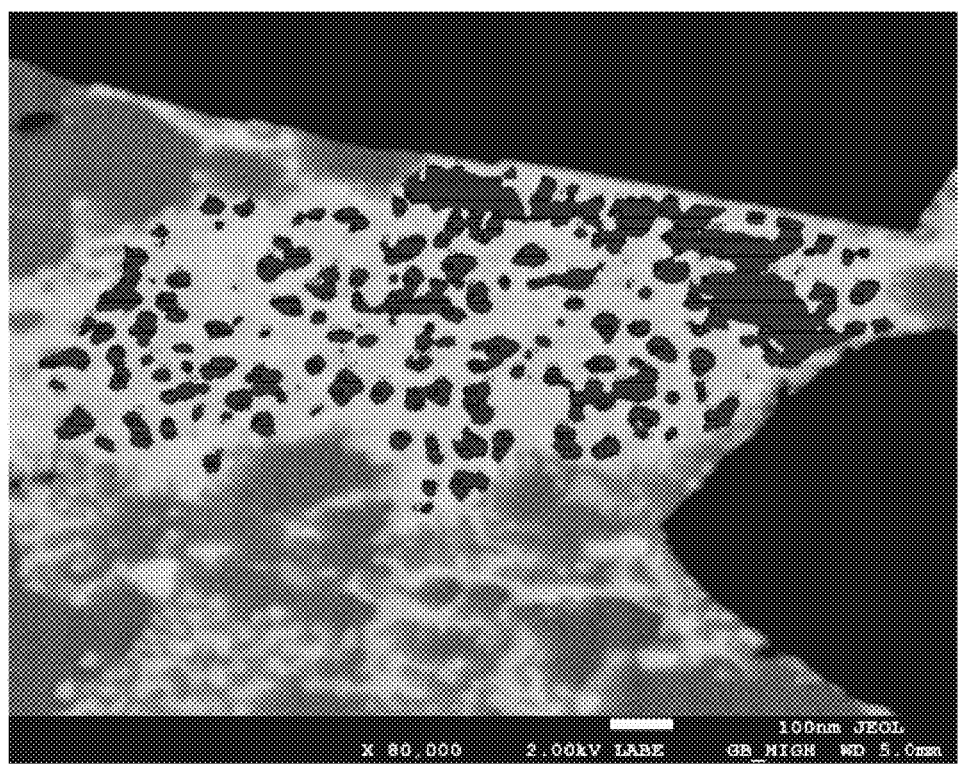
FIG. 3 is an image showing a result of distinguishing between $ZrO_2$ and $Al_2O_3$ in the reflection electron image of the obtained sintered compact in the Example.

Next, the region having been captured in the photograph was captured in a photograph at an acceleration voltage of 2 kV with a magnification of ×80000. In the obtained photograph (reflection electron image), the following analysis was performed onto a region (first region) that had not less than 5 volume % and not more than 50 volume % of $Al_2O_3$ particles (fine-particle aluminum oxide) each having a radius of not less than 0.1 μm and having an average particle size of not more than 80 nm. First, image analysis software (trademark "WinROOF ver.7.4.1" provided by Mitani Corporation) was used to perform a binarization process to distinguish between $ZrO_2$ and $Al_2O_3$ (FIG. 3). In FIG. 3, $ZrO_2$ is shown as a light gray region and $Al_2O_3$ is shown as a dark gray region. Then, (not less than two) arbitrary straight lines were drawn in the first region, continuous distances occupied by the $Al_2O_3$ particles on the straight lines were determined, and the average value and standard deviation thereof were calculated. Moreover, continuous distances occupied by $ZrO_2$ on the straight lines were determined and the average value and standard deviation thereof were calculated. The result of calculation is shown in Table 1.

[High-Speed Cutting Test]

Sintered compact No. 1 thus obtained was used to manufacture a cutting tool with a shape of TCGW110208, a negative land angle of 15°, and a negative land width of 0.12 mm. Under the following cutting condition, a high-speed cutting test was performed to the obtained cutting tool using a machining center.

(Cutting Condition)
Cutting speed: 900 m/min.
Feeding speed: 0.4 mm/rev.
Depth of cut: 0.3 mm
Coolant: Wet type (20-times diluted emulsion).
(Machining Center)
NV5000 α1A/40 (product number as provided by DMG MORI Co., Ltd).
(Workpiece)
Material: centrifugal cast iron (FC250 (gray cast iron) having dense perlite, dendrite structure, and the like)
Shape: Cylindrical (outer diameter of 85 mm; inner diameter of 75 mm).

(Cutting Test)

A maximum flank wear amount (μm) after cutting for 4.0 km was measured and a chipping life (km) until occurrence of chipping of not less than 0.2 mm was measured. Results thereof are shown in Table 1.

[Sintered Compacts No. 2 to No. 4]

Except that the sintering condition was changed as shown in Table 1, sintered compacts No. 2 to No. 4 were produced in accordance with the method for producing sintered compact No. 1. In accordance with the method for evaluating sintered compact No. 1, the sintered compact structures of sintered compacts No. 2 to No. 4 obtained were evaluated, and a high-speed cutting test was performed to sintered compacts No. 2 to No. 4. Results thereof are shown in Table 1.

Specifically, first, Zr-i-$(OC_3H_7)_4$, $Al(OC_3H_7)_3$, and $Y(OC_3H_7)_3$ are treated for 2 hours in 2-propanol, and then $NH_4OH$ is added thereto. In doing so, these three compounds are mixed such that 1.5 mol % of $Y_2O_3$ and 25 mol % of $Al_2O_3$ are included relative to $ZrO_2$. Next, reflux is performed at 78° C. for 24 hours, thereby obtaining a hydrolysis product. Then, this hydrolysis product is centrifuged and is then washed with hot water. The hydrolysis product thus washed with the hot water is dried at 120° C. in vacuum. In this way, amorphous solid solution powder is obtained.

The obtained amorphous solid solution powder is calcinated (heated) for 9 hours at 700° C. in the air, and is further calcinated at 900° C. in air for 1 hour. In this way, crystalline

TABLE 1

| | | | Blending Amounts of Raw Materials (Volume %) | | | | Sintered Compact Structure First Region | |
|---|---|---|---|---|---|---|---|---|
| | | | | First Region | | | Fine-Particle Aluminum Oxide | |
| Sintered Compact No. | Sintering Condition Press. (GPa) | Sintering Condition Temp. (° C.) | cBN | Material (Neutralization Co-Precipitation) | Third Material | Sintering Auxiliary Agent | Average Particle Size (nm) | Volume Content (Volume %) |
| Ex. 1 | 7 | 1450 | 55 | 25 | 15 | 5 | 28 | 7.5 |
| Ex. 2 | 7 | 1350 | 55 | 25 | 15 | 5 | 5 | 7.1 |
| Ex. 3 | 7 | 1800 | 55 | 25 | 15 | 5 | 80 | 7.6 |
| Comp. Ex. 4 | 6 | 1800 | 55 | 25 | 15 | 5 | 300 | 7.5 |

| | Sintered Compact Structure First Region | | | | | |
|---|---|---|---|---|---|---|
| | Continuous Distances Occupied By Fine-Particle Aluminum Oxide | | Continuous Distances Occupied By Zr Compound | | High-Speed Cutting Test | |
| Sintered Compact No. | Average Value (μm) | Standard Deviation (μm) | Average Value (μm) | Standard Deviation (μm) | Maximum Flank Wear Amount Upon Cutting For 4.0 km (mm) | Chipping Life (km) |
| Ex. 1 | 0.03 | 0.03 | 0.06 | 0.07 | 0.121 | 12.0 |
| Ex. 2 | 0.005 | 0.005 | 0.008 | 0.009 | 0.130 | 11.5 |
| Ex. 3 | 0.08 | 0.08 | 0.1 | 0.1 | 0.115 | 10.2 |
| Comp. Ex. 4 | 0.3 | 0.3 | 0.9 | 0.9 | 0.150 | 4.0 |

[Sintered Compact No. 5]

[Production of Sintered Compact]

Except that the first region material was produced as described below, sintered compact No. 5 was produced in accordance with the method for producing sintered compact No. 1. In accordance with the method for evaluating sintered compact No. 1, the sintered compact structure of sintered compact No. 5 obtained was evaluated, and a high-speed cutting test was performed to sintered compact No. 5 obtained. A result thereof is shown in Table 2.

<Production of First Region Material>

The sol-gel method is, for example, described in a paper (J. Jpn. Soc. Powder Power Metallurgy, Vol. 58, No. 12, P727-732) published in 2011.

$ZrO_2$ (in which $Al_2O_3$ and $Y_2O_3$ are mixed in the solid state) (the first region material) is obtained.

[Sintered Compacts No. 6 to No. 8]

Except that the sintering condition was changed as shown in Table 2, sintered compacts No. 6 to No. 8 were produced in accordance with the method for producing sintered compact No. 5. In accordance with the method for evaluating sintered compact No. 1, the sintered compact structures of sintered compacts No. 6 to No. 8 obtained were evaluated, and a high-speed cutting test was performed to sintered compacts No. 6 to No. 8 obtained. Results thereof are shown in Table 2.

TABLE 2

| | Sintered Compact No. | Sintering Condition Press. (GPa) | Sintering Condition Temp. (° C.) | Blending Amounts of Raw Materials (Volume %) cBN | First Region Material (Sol-Gel) | Third Material | Sintering Auxiliary Agent | Sintered Compact Structure First Region Fine-Particle Aluminum Oxide Average Particle Size (nm) | Sintered Compact Structure First Region Fine-Particle Aluminum Oxide Volume Content (Volume %) |
|---|---|---|---|---|---|---|---|---|---|
| Ex. | 5 | 7 | 1450 | 55 | 25 | 15 | 5 | 39 | 7.4 |
| Ex. | 6 | 7 | 1400 | 55 | 25 | 15 | 5 | 28 | 7.5 |
| Ex. | 7 | 7 | 1800 | 55 | 25 | 15 | 5 | 76 | 7.8 |
| Ex. | 8 | 7 | 1300 | 55 | 25 | 15 | 5 | 5 | 7.0 |

| | Sintered Compact No. | Sintered Compact Structure First Region Continuous Distances Occupied By Fine-Particle Aluminum Oxide Average Value (μm) | Sintered Compact Structure First Region Continuous Distances Occupied By Fine-Particle Aluminum Oxide Standard Deviation (μm) | Continuous Distances Occupied By Zr Compound Average Value (μm) | Continuous Distances Occupied By Zr Compound Standard Deviation (μm) | High-Speed Cutting Test Maximum Flank Wear Amount Upon Cutting For 4.0 km (mm) | High-Speed Cutting Test Chipping Life (km) |
|---|---|---|---|---|---|---|---|
| Ex. | 5 | 0.05 | 0.05 | 0.08 | 0.07 | 0.113 | 12.4 |
| Ex. | 6 | 0.02 | 0.01 | 0.05 | 0.03 | 0.115 | 12.0 |
| Ex. | 7 | 0.08 | 0.08 | 0.1 | 0.1 | 0.102 | 10.2 |
| Ex. | 8 | 0.002 | 0.002 | 0.005 | 0.005 | 0.125 | 11.2 |

[Sintered Compacts No. 9 to No. 13]

Except that the blending ratio of the raw materials of the sintered compact is changed to a blending ratio shown in Table 3, sintered compacts No. 9 to No. 13 were produced in accordance with the method for producing sintered compact No. 1. In accordance with the method for evaluating sintered compact No. 1, the sintered compact structures of sintered compacts No. 9 to No. 13 obtained were evaluated, and a high-speed cutting test was performed to sintered compacts No. 9 to No. 13 obtained. Results thereof are shown in Table 3.

TABLE 3

| | Sintered Compact No. | Sintering Condition Press. (GPa) | Sintering Condition Temp. (° C.) | Blending Amounts of Raw Materials (Volume %) cBN | First Region Material (Neutralization Co-Precipitation) | Third Material | Sintering Auxiliary Agent | Sintered Compact Structure First Region Fine-Particle Aluminum Oxide Average Particle Size (nm) | Sintered Compact Structure First Region Fine-Particle Aluminum Oxide Volume Content (Volume %) |
|---|---|---|---|---|---|---|---|---|---|
| Ex. | 9 | 7 | 1450 | 15 | 70 | 10 | 5 | 39 | 20 |
| Ex. | 10 | | | 20 | 65 | 10 | 5 | 36 | 18 |
| Ex. | 11 | | | 30 | 55 | 10 | 5 | 30 | 15 |
| Ex. | 12 | | | 60 | 25 | 10 | 5 | 28 | 7.8 |
| Ex. | 13 | | | 80 | 5 | 10 | 5 | 32 | 1.5 |

TABLE 3-continued

| | | Sintered Compact Structure First Region | | | | High-Speed Cutting Test | |
|---|---|---|---|---|---|---|---|
| | | Continuous Distances Occupied By Fine-Particle Aluminum Oxide | | Continuous Distances Occupied By Zr Compound | | Maximum Flank | |
| | Sintered Compact No. | Average Value (μm) | Standard Deviation (μm) | Average Value (μm) | Standard Deviation (μm) | Wear Amount Upon Cutting For 4.0 km (mm) | Chipping Life (km) |
| Ex. | 9 | 0.004 | 0.003 | 0.009 | 0.009 | 0.135 | 9.4 |
| Ex. | 10 | 0.004 | 0.002 | 0.008 | 0.008 | 0.133 | 9.8 |
| Ex. | 11 | 0.003 | 0.002 | 0.008 | 0.008 | 0.121 | 10.7 |
| Ex. | 12 | 0.003 | 0.003 | 0.008 | 0.1 | 0.158 | 12.0 |
| Ex. | 13 | 0.002 | 0.002 | 0.005 | 0.006 | 0.163 | 9.0 |

[Sintered Compacts No. 14 to No. 25]

Except that the blending ratio of the first region material was changed from 25 volume % to 15 volume % and that the fourth material or fifth material shown in Table 4 was used as a raw material of the sintered compact, sintered compacts No. 14 to No. 25 were produced in accordance with the method for producing sintered compact No. 1. In accordance with the method for evaluating sintered compact No. 1, the sintered compact structures of sintered compacts No. 14 to No. 25 obtained were evaluated. Results thereof are shown in Table 5.

Moreover, in accordance with a method described below, a high-speed cutting test was performed to sintered compacts No. 14 to No. 25 obtained.

[High-Speed Cutting Test]

Sintered compacts No. 14 to No. 25 thus obtained were used to manufacture cutting tools each with a shape of TCGW110208, a negative land angle of 15°, and a negative land width of 0.12 mm. Under the following cutting condition, a high-speed rotation cutting test was performed to each of the obtained cutting tools using a machining center.

(Cutting Condition)
Cutting speed: 600 m/min.
Feeding speed: 0.3 mm/rev.
Depth of cut: 0.2 mm
Coolant: Wet type (20-times diluted emulsion).
(Machining Center)
NV5000 α1A/40 (product number as provided by DMG MORI Co., Ltd).
(Workpiece)
Material: centrifugal cast iron (FC250 (gray cast iron) having dense perlite, dendrite structure, and the like)
Shape: Cylindrical (outer diameter of 80 mm; inner diameter of 70 mm).
(Cutting Test)
The maximum flank wear amount (μm) after cutting for 7.0 km was measured and a chipping life (km) until occurrence of chipping of not less than 0.2 mm was measured. Results thereof are shown in Table 5.

TABLE 4

| | | | | Blending Amounts of Raw Materials (Volume %) | | | | | | | | | | | | | |
|---|---|---|---|---|---|---|---|---|---|---|---|---|---|---|---|---|---|
| | | Sintering Condition | | | First Region Material | | | | | | | | | | | | Sintering Auxiliary Agent |
| Sintered Compact No. | Press. (GPa) | Temp. (° C.) | cBN | (Neutralization Co-Precipitation) | Third Material | Fourth Material | | | | Fifth Material | | | | | | | |
| | | | | | | $Y_2O_3$ | CeO | MgO | HfO | AlCrN | TiCrN | ZrC | ZrN | TiC | TiN | $Si_3N_4$ | |
| Ex. 14 | 7 | 1450 | 55 | 15 | 15 | 10 | — | — | — | — | — | — | — | — | — | — | 5 |
| Ex. 15 | | | 55 | 15 | 15 | — | 5 | 5 | — | — | — | — | — | — | — | — | 5 |
| Ex. 16 | | | 55 | 15 | 15 | — | — | — | 10 | — | — | — | — | — | — | — | 5 |
| Ex. 17 | | | 55 | 15 | 15 | — | — | — | — | 10 | — | — | — | — | — | — | 5 |
| Ex. 18 | | | 55 | 15 | 15 | — | — | — | — | — | 10 | — | — | — | — | — | 5 |
| Ex. 19 | | | 55 | 15 | 15 | — | — | — | — | — | — | 10 | — | — | — | — | 5 |
| Ex. 20 | | | 55 | 15 | 15 | — | — | — | — | — | — | — | 10 | — | — | — | 5 |
| Ex. 21 | | | 55 | 15 | 15 | — | — | — | — | — | — | — | — | 10 | — | — | 5 |
| Ex. 22 | | | 55 | 15 | 15 | — | — | — | — | — | — | — | — | — | 10 | — | 5 |
| Ex. 23 | | | 55 | 15 | 15 | — | — | — | — | — | — | — | — | — | — | 10 | 5 |
| Ex. 24 | | | 55 | 15 | 15 | 2 | — | — | — | 8 | — | — | — | — | — | — | 5 |
| Ex. 25 | | | 55 | 15 | 15 | 2 | — | — | — | — | — | — | — | 8 | — | — | 5 |

TABLE 5

| | Sintered Compact No. | Sintered Compact Structure First Region | | | | | | High-Speed Cutting Test | |
|---|---|---|---|---|---|---|---|---|---|
| | | Fine-Particle Aluminum Oxide | | Continuous Distances Occupied By Fine-Particle Aluminum Oxide | | Continuous Distances Occupied By Zr Compound | | | |
| | | Average Particle Size (nm) | Volume Content (Volume %) | Average Value (μm) | Standard Deviation (μm) | Average Value (μm) | Standard Deviation (μm) | Maximum Flank Wear Amount Upon Cutting For 7.0 km (mm) | Chipping Life (km) |
| Ex. | 14 | 34 | 4.2 | 0.02 | 0.02 | 0.05 | 0.06 | 0.153 | 13.1 |
| Ex. | 15 | 38 | 4.0 | 0.02 | 0.02 | 0.07 | 0.08 | 0.164 | 13.7 |
| Ex. | 16 | 30 | 4.0 | 0.03 | 0.02 | 0.06 | 0.07 | 0.162 | 12.9 |
| Ex. | 17 | 35 | 4.5 | 0.03 | 0.02 | 0.04 | 0.05 | 0.135 | 15.0 |
| Ex. | 18 | 29 | 4.8 | 0.03 | 0.03 | 0.06 | 0.05 | 0.145 | 14.6 |
| Ex. | 19 | 36 | 3.8 | 0.02 | 0.02 | 0.06 | 0.06 | 0.147 | 13.4 |
| Ex. | 20 | 32 | 4.7 | 0.03 | 0.02 | 0.04 | 0.05 | 0.172 | 12.4 |
| Ex. | 21 | 32 | 4.8 | 0.05 | 0.06 | 0.06 | 0.06 | 0.178 | 13.5 |
| Ex. | 22 | 28 | 4.7 | 0.03 | 0.03 | 0.07 | 0.07 | 0.166 | 13.1 |
| Ex. | 23 | 31 | 3.6 | 0.02 | 0.02 | 0.05 | 0.06 | 0.180 | 11.8 |
| Ex. | 24 | 40 | 4.5 | 0.03 | 0.02 | 0.08 | 0.10 | 0.141 | 14.8 |
| Ex. | 25 | 39 | 4.6 | 0.03 | 0.03 | 0.08 | 0.07 | 0.157 | 13.8 |

[Review]
<Sintered Compacts No. 1 to No. 4>

Sintered compact No. 4 had a larger maximum flank wear amount (μm) and a shorter chipping life (km) after cutting for 4.0 km than those of sintered compacts No. 1 to No. 3. Based on this fact, it was found that both excellent chipping resistance and excellent wear resistance can be achieved in the cutting tool as long as the average value of the continuous distances occupied by the fine-particle aluminum oxide is not more than 0.08 μm and the standard deviation of the continuous distances occupied by the fine-particle aluminum oxide is not more than 0.1 μm on the arbitrary straight lines in the first region.

Moreover, sintered compact No. 1 had a longer chipping life (km) than those of sintered compacts No.2 and No. 3. Based on this fact, it was found that the chipping resistance can be more excellent in the cutting tool as long as the average value of the continuous distances occupied by the fine-particle aluminum oxide is not less than 0.01 μm and not more than 0.05 μm and the standard deviation of the continuous distances occupied by the fine-particle aluminum oxide is not less than 0.01 μm and not more than 0.05 μm on the arbitrary straight lines in the first region.

<Sintered Compacts No. 5 to No. 8>

Both the maximum flank wear amounts (μm) and the chipping lives (km) in sintered compacts No. 5 to No. 8 after cutting for 4.0 km exhibited the same tendencies as those of sintered compacts No. 1 to No. 3. Based on this fact, it was found that both excellent chipping resistance and excellent wear resistance can be achieved in the cutting tool irrespective of the method for producing the first region material as long as the average value of the continuous distances occupied by the fine-particle aluminum oxide is not more than 0.08 μm and the standard deviation of the continuous distances occupied by the fine-particle aluminum oxide is not more than 0.1 μm on the arbitrary straight lines in the first region.

Moreover, sintered compacts No. 5 and No. 6 had longer chipping lives (km) than those of sintered compacts No. 7 and No. 8. Also based on this result, it was found that the chipping resistance can be more excellent in the cutting tool as long as the average value of the continuous distances occupied by the fine-particle aluminum oxide is not less than 0.01 μm and not more than 0.05 μm and the standard deviation of the continuous distances occupied by the fine-particle aluminum oxide is not less than 0.01 μm and not more than 0.05 μm on the arbitrary straight lines in the first region.

<Sintered Compacts No. 9 to No. 13>

Both the maximum flank wear amounts (μm) and the chipping lives (km) in sintered compacts No. 9 to No. 13 after cutting for 4.0 km exhibited the same tendencies as those of sintered compacts No. 1 to No. 3. Based on this fact, it was found that both excellent chipping resistance and excellent wear resistance can be achieved in the cutting tool without depending much on the blending amount of the cubic boron nitride or the blending amount of the first region material, as long as the average value of the continuous distances occupied by the fine-particle aluminum oxide is not more than 0.08 μm and the standard deviation of the continuous distances occupied by the fine-particle aluminum oxide is not more than 0.1 μm on the arbitrary straight lines in the first region.

Moreover, each of sintered compacts No. 11 and No. 12 had a longer chipping life (km) than those of sintered compacts No. 9, No. 10, and No. 13. Based on this fact, it was found that the chipping resistance of the cutting tool becomes more excellent as long as the content volume of the cubic boron nitride in the sintered compact is not less than 30 volume % and not more than 60 volume %.

<Sintered Compacts No. 14 to No. 25>

Each of sintered compacts No. 14 to No. 25 exhibited a slightly larger value of maximum flank wear amount (μm) than those of sintered compacts No. 1 to No. 3 after cutting for 7.0 km and a longer chipping life (km) than those of sintered compacts No. 1 to No. 3. Based on these facts, it was found that the wear resistance of the cutting tool can be improved and the chipping resistance of the cutting tool can be significantly improved when the sintered compact further has the fourth material or the fifth material.

The embodiments disclosed herein are illustrative and non-restrictive in any respect. The scope of the present invention is defined by the terms of the claims, rather than the embodiments described above, and is intended to include any modifications within the scope and meaning equivalent to the terms of the claims.

The invention claimed is:

1. A sintered compact comprising a first material, a second material, and a third material,
the first material being cubic boron nitride,
the second material being a compound including zirconium,
the third material being an aluminum oxide,
the aluminum oxide including a fine-particle aluminum oxide,
the sintered compact having a first region in which not less than 5 volume % and not more than 50 volume % of the fine-particle aluminum oxide is dispersed in the second material,
on arbitrary straight lines in the first region, an average value of continuous distances occupied by the fine-particle aluminum oxide being not more than 0.08 μm and a standard deviation of the continuous distances occupied by the fine-particle aluminum oxide being not more than 0.1 μm.

2. The sintered compact according to claim 1, wherein on the arbitrary straight lines in the first region, the average value of continuous distances occupied by the fine-particle aluminum oxide is not less than 0.01 μm and not more than 0.05 μm and the standard deviation of the continuous distances occupied by the fine-particle aluminum oxide is not less than 0.01 μm and not more than 0.05 μm.

3. The sintered compact according to claim 1, wherein in the first region, not less than 15 volume % and not more than 40 volume % of the fine-particle aluminum oxide is dispersed in the second material.

4. The sintered compact according to claim 1, wherein not less than 20 volume % and not more than 80 volume % of the first material is included in the sintered compact.

5. The sintered compact according to claim 1, wherein not less than 30 volume % and not more than 60 volume % of the first material is included in the sintered compact.

6. The sintered compact according to claim 1, further comprising a fourth material, wherein the fourth material is at least one selected from a group consisting of magnesium oxide, cerium oxide, yttrium oxide, and hafnium oxide.

7. The sintered compact according to claim 1, further comprising a fifth material, wherein the fifth material is at least one compound composed of (i) at least one element selected from a group consisting of a group 4 element, a group 5 element, a group 6 element in a periodic table, Al, and Si, and (ii) at least one element selected from a group consisting of carbon, nitrogen, and boron.

8. A cutting tool comprising the sintered compact recited in claim 1.

* * * * *